United States Patent [19]

Rosenblatt

[11] Patent Number: 5,231,849
[45] Date of Patent: Aug. 3, 1993

[54] DUAL-TEMPERATURE VEHICULAR ABSORPTION REFRIGERATION SYSTEM

[76] Inventor: Joel H. Rosenblatt, P.O. Box 198, Summerland Key, Fla. 33042

[21] Appl. No.: 945,241

[22] Filed: Sep. 15, 1992

[51] Int. Cl.$^5$ .............................................. B60H 3/04
[52] U.S. Cl. ..................................... 62/238.3; 62/476
[58] Field of Search ................ 62/476, 239, 238.3, 62/323.2, 101

[56] References Cited

U.S. PATENT DOCUMENTS

| | | | |
|---|---|---|---|
| 2,118,739 | 5/1938 | Schulman | 62/238.3 |
| 2,783,622 | 3/1957 | Bourassa | 62/238.3 |
| 3,661,200 | 5/1972 | McNamara | 165/42 |
| 4,100,755 | 7/1978 | Leonard | 62/476 |
| 4,253,310 | 3/1981 | Sokolov | 62/79 |
| 4,341,088 | 7/1982 | Mei et al. | 62/239 |
| 4,589,262 | 5/1986 | Nagao | 62/141 |
| 4,914,924 | 4/1990 | Takahashi | 62/133 |
| 5,056,326 | 10/1991 | Ohkumo et al. | 62/133 |

Primary Examiner—Albert J. Makay
Assistant Examiner—William C. Doerrler
Attorney, Agent, or Firm—Jacobson, Price, Holman & Stern

[57] ABSTRACT

An ammonia absorption refrigeration system includes a generator vessel (G) in a casing (M) through which engine exhaust gas flows in heat exchange relation with the generator vessel, ammonia/water refrigerant solution being contained in the generator to be vaporized therein by the heat from the exhaust gas, a condenser (C) through which vaporized refrigerant flows from the generator, at least one evaporator (U, V) through which refrigerant flows from the condenser, and at least one absorber (W, Y) through which refrigerant flows from the evaporator (S) to be returned by a refrigerant pump (H, J) to the generator (G). A coolant flow circuit is interconnected with the evaporators for cooling secondary coolant in the evaporators and includes a coolant storage tank (Q) containing the coolant which may be a low freezing-point liquid or a refrigerant brine, a coolant pump (N) connected to the coolant tank for pumping coolant from the tank through cooling conduits (30-37) which conduct the coolant through the evaporators in heat exchange relationship with the refrigerant therein and through respective comfort zone and cargo zone cooling units for cooling the zones at different temperatures, the comfort zone being a passenger zone in the tractor of a tractor-trailer for example, and the cargo zone being a refrigerated compartment in the trailer. Refrigerant and coolant conduits, valves in the conduits including pressure-reducing valves (9, 11, 14, 18), temperature sensors (100, 102, 104, 110) and control devices (106, 114) are provided to control the separate flows of the refrigerant and coolant and the flow of the exhaust gas to the generator to obtain the desired temperatures in the comfort zone and cargo zone.

18 Claims, 3 Drawing Sheets

DUAL-TEMPERATURE VEHICULAR ABSORPTION REFRIGERATION SYSTEM

BACKGROUND OF THE INVENTION

This invention relates to a dual temperature absorption refrigeration system for a vehicle and more particularly for use in commercial vehicles such as refrigerated trucks for transporting perishable commodities.

Wide-spread efforts are currently under way to develop "drop-in" replacements for common forms of halogenated hydrocarbon refrigerants (CHC's) to overcome stratospheric ozone depletion problems, but permit existing types of vapor compression refrigeration to continue in service.

Principal sources of escaping CHC refrigerants are vehicle air-conditioning systems. While "drop-in" replacements might be developed for these systems, use of vehicular vapor-compression refrigeration systems themselves encumber a substantial consumption of automotive fuels to deliver shaft power supplying compressors of these air-conditioning systems.

Public attention has also been attracted to need to conserve petroleum fuel resources and need to reduce vehicular air pollution resulting from its consumption in motor vehicles. Approximately 15% of fuel consumed by air-conditioned vehicles is caused by power demands of air-conditioning compressors driven from crankshaft power to supply air-conditioning demand.

In refrigerated truck cargo applications, more than power to provide comfort air-conditioning for the driver is required by concurrent need to provide refrigeration for cargo. Many frozen foods must be transported while maintaining them in a sub-freezing condition, and many dairy products and beverages, while not requiring freezing conditions, must be maintained in transit in a chilled condition. Refrigeration equipment to supply that cargo requirement also depends upon petroleum fuel consumption to drive refrigeration compressors. In such systems, refrigeration temperatures required for the differing demands require two different evaporator pressures to effect.

Refrigeration systems supplying refrigeration at more than one temperature have been used in known vapor-compression refrigeration applications, and have been accomplished by the use of multiple effect compressors in which lower pressure refrigerant vapor enters the compressor farther down in its compression cycle while higher pressure vapor enters farther up, with both exiting the compressor at a common exit pressure.

Cascade absorption refrigeration systems have also been constructed in the prior art employing multiple absorbers and evaporators arranged in series. An upper cycle provides lowered temperatures for the absorber in a succeeding stage, permitting lower operating pressure in the succeeding absorber and evaporator, such a cascaded set serving to permit achieving far lower ultimate refrigeration temperatures in the final stage than could have been realized by a simple cycle alone. In one such ammonia/water absorption refrigeration cascade system built in Germany prior to World War I, the final evaporator stage of the cascade delivered refrigeration at a temperature below −90° F. (−67° C.), inferring an evaporator and absorber operating pressure in the final stage in the high vacuum range of approximately 1.7 psia or lower. The end product was that final refrigeration temperature.

There are essentially three general types of evaporators employed in the refrigeration industry. The "flooded" and "wet expansion" evaporators require maintenance of a controlled liquid level of refrigerant in the evaporator. The "dry expansion" ("once-through" type) operates with a variable liquid volume of refrigerant in the evaporator, is simpler and less expensive, and is generally employed where the installation is subject to vibration or movement (viz.—aboard ships and aircraft).

In excess of thirty percent of the heat energy value of automotive fuels consumed is dissipated as waste heat from vehicle engine exhausts and cooling systems. A very old form of refrigeration system, invented in France shortly before the American Civil War, commonly known as "absorption refrigeration" (AR), does not depend on a mechanical vapor-compression process. The process involves a thermodynamic refrigeration cycle in which: absorption of a refrigerant in an absorbent at low pressure occurs in an "absorber" vessel; pressurizing the resulting solution (the strong refrigerant/absorbent liquor); heating the strong pressurized liquor from an external heat source to evaporate off refrigerant vapor in the "generator" vessel (a distillation process); condensing the refrigerant vapor so liberated by external cooling in the "condenser" vessel; and releasing the high pressure refrigerant condensate through a pressure reducing device to cause revaporization of the refrigerant with heat of vaporization being absorbed from whatever is being refrigerated in the "evaporator" vessel (the same evaporative cooling process that occurs in vapor-compression refrigeration cycles).

At that point, weak high pressure refrigerant/absorbent solution residue left in the generator, after refrigerant has been distilled off, is returned from the generator via a pressure reducing device, recombined with low pressure refrigerant vapor returned from the evaporator, and cooled in the absorber vessel to reconstitute the strong liquor solution and repeat the cycle.

The oldest form of such systems employed ammonia as refrigerant and water as absorbent. Ammonia contains no halogen atoms at all, and even its gradual leakage into the atmosphere poses no environmental or atmospheric risks. By employing waste heat discharged from vehicle internal combustion engines as an external input energy source to an ammonia AR system (AAR) operating on an ammonia/water combination, the engine shaft can be relieved of the load created by power demand to drive the compressor of a vapor-compression refrigeration system, and all risk of discharging CHC's can be eliminated.

The basic concept of employing AR systems for automotive application has been reported in the prior art dating back to the 1920's. Little has been done to develop the concept due to the convenience and simplicity with which small compressors could be installed as component auxiliaries under the hood of the engine compartment of automotive vehicles, and the simplicity of their installation along a vehicle assembly line.

Another difficulty has been limitation on development of suitable operating cycles because of temperature variation of available waste heat sources from vehicular internal combustion engines.

Exhaust heat offers a higher temperature heat source for AR system external energy supply. Exhaust temperatures are highly variable depending on engine loading. Diesel engine exhaust may be in the 400° to 500° F.

(205° to 260° C.) range at 75% load and drop to the 200° to 300° F. (93.5° to 149° C.) range during idling. Use of pollution control exhaust devices also affects exhaust temperatures. Thermally controlled pollution abatement systems may operate close to the engine exhaust outlets at temperatures in the 1500° F. (815° C.) range. Catalytic systems, placed farther along the exhaust system operate in the 800° to 1,000° F. (427° to 538° C.) range.

Examples of total heat energy loss from internal combustion engines removed by coolant circulation include 20% to 35% for automotive diesels and up to 40% at one-third load. Brake horsepower fuel value heat losses amount to 40 to 50% for large diesels and 100 to 150% for automotive engines.

Other than peak temperature sources available as input to an AR cycle, ability of an AR system to operate effectively is also constrained by coolest ambient temperature available for operation of refrigerant condensers and removal of waste heat rejected from absorber vessels. This is ultimately related to temperature of ambient air. For vehicle refrigeration systems to be capable of reliable year round operation in any part of the country, this may require use of a design cooling air temperature at least as hot as the hottest ambient air through which a vehicle may be expected to operate.

Typical vehicle radiators are designed on the basis of a 100° F. (55.6° C.) temperature gradient between ambient air and circulating coolant fluid temperature. The cooling effect created normally results in a temperature drop in the coolant between 35° and 40° F. (19.4° and 22.2° C.) It is possible that with minimum design temperatures for condenser and absorber cooling being limited by mid-afternoon temperatures in Death Valley, and peak engine heat source temperatures limited by inability of engine lubricants to withstand temperatures much above those cited, the remaining temperature gradient available across which an AAR system might be operated was in a range making further development in use of ammonia/water AR cycles too difficult to permit design of practical systems.

Wide variation in engine exhaust temperatures in response to load variation was also too great to permit reliable control of the heat source to supply an AR system, with wide fluctuations in radiator coolant fluid temperatures creating additional problems with use of that coolant as an AAR system heat sink.

Recent evolution of sophisticated solid state electronic control systems now permits a variety of variables to be controlled reliably, instantaneously, and discontinuously in service. The enormous amount of waste heat energy available suggests that its use as input to an automotive AR system can permit such a system to supply comfort air-conditioning for personnel and refrigeration for cargo. Starting with a "free" source of energy for refrigeration, additional applications may be developed to use it to: improve lubrication cooling; adapt exhaust pollution control devices to their optimum operating temperatures; etc.,—all powered at no fuel energy consumption cost by a waste heat energy source otherwise being discarded.

In addition, recent developments in communications technology permit manufacturing to be undertaken in response to identifiable "niche" market requirements. There is more than enough refrigerated cargo moving in the United States that does not traverse Death Valley at mid-afternoon in mid-summer to justify producing units capable of reducing fuel consumption for all remaining refrigerated trucking services even if they were not suitable for trans-desert application.

There are essentially four fluid stream flows available for integration with an AAR system: the engine coolant, varying between its temperature at entry to the radiator and its temperature on leaving the radiator; engine lubricant flow, varying between its temperature leaving the engine and its temperature leaving a lube-oil cooler if present; engine exhaust stream, varying between its temperature leaving the exhaust manifold, leaving an intermediate pollution control "converter", and leaving the muffler, and in response to changes in engine power demand; and the fourth stream being flow of ambient air, around and past the vehicle.

Vehicle radiators for truck Diesel engines may be generalized as operating with an assumed temperature differential of approximately 110° F. (61° C.) between coolant and ambient air. A 30° to 40° F. (17° to 22° C.) temperature drop normally occurs in the coolant as it passes through the radiator. The thermostat in the coolant line to the radiator is commonly set to open at about 190° F. (88° C.). That would define current generalized operating temperature constraints for selection of AAR subsystem refrigerant condenser and absorber when use of a circulating engine coolant stream is being considered as heat sink for an AAR cycle. Gasoline engines may operate somewhat at variance with these figures, but the principle remains similar in establishing AAR subsystem design criteria.

BRIEF SUMMARY OF THE INVENTION

It is an object of the present invention to provide an AAR cycle for vehicular application in which radiator temperature selection, lubrication oil temperature parameters, and/or exhaust stream temperatures are coordinated with AAR cycle operating parameters to permit both to co-exist in the vehicle under consideration and thereby facilitate development of an engine system with its associated AAR sub-system as an integrated design. An automated control system receiving signals from pressure and temperature sensing devices and supplying control output to valve and pump motor controls and refrigerant flow to the evaporator(s) assures maintenance of intended refrigeration cycle operating parameters despite fluctuations in temperatures and mass flow rates of circulating engine fluid streams across the range of vehicle operating conditions.

Another object of this invention is to provide sub-freezing refrigeration temperatures as required to permit refrigeration produced by use of waste heat discharged from automotive truck engines to refrigerate cargo carried in refrigerated freight applications, requiring sub-freezing refrigeration temperatures, while concurrently producing comfort air-conditioning refrigeration at temperatures just above freezing.

A further object of this invention is to provide automotive refrigeration at no adverse environmental impact risk as a result of refrigerant leakage.

A still further object of this invention is to relieve the engine of the fuel demanding load of driving compressors of a vapor-compression refrigeration systems with engine shaft power, and thereby effect increased fuel economy of vehicles with refrigeration devices in operation.

Another object of this invention is to permit optimum use of refrigeration capacity evolved to provide required passenger comfort, cargo refrigeration as needed, and to permit additional refrigeration capacity to be beneficially employed to control operating temperature variables in other engine systems (viz.—lube oil temperature, exhaust converter temperature, etc.),—all powered by an energy source otherwise wasted to heat ambient air.

While a third of the energy available from automotive fuel is discharged as waste heat, the amount of power being delivered by a vehicle varies with the service in which the vehicle is employed. In urban traffic conditions, with frequent stops, low speed movement, etc., idling engines are delivering very little power, and offer less waste heat for recovery. However, intercity freight carriers and buses operate most of the time, as nearly as possible, at optimum power delivery for the engine sizes with which they are equipped. Refrigerated cargo itself creates a storage capacity to carry its intended temperature within intended ranges across relatively brief interruptions of refrigeration supply that might occur during brief engine idling periods when the mass flow of the exhaust stream may temporarily be inadequate to maintain the full intended refrigeration delivery rate (tons of refrigeration required). Use of chilled eutectic solutions to store refrigeration capacity between periods of lack of access to external refrigeration supply has also been used in the prior art for refrigerated cargo trailers to provide short term maintenance of refrigeration conditions in the absence of a continuous supply of externally produced refrigeration capacity. A similar refrigeration "storage" function is supplied in the systems described below by incorporation of a refrigerant surge tank.

Conventionally, an independent, vapor compression refrigeration unit driven by a small independent internal combustion engine is commonly installed on cargo trailers to not only supply cargo refrigeration in transit, but to maintain refrigeration when the trailer has been dropped off and the tractor is no longer attached or available. Such a unit may still be needed in the absence of the tractor equipped with the system described herein, but the independent trailer mounted engine may be turned off at all times in transit when the tractor supplies refrigeration and thereby eliminate fuel consumption by the independent internal combustion engine on the trailer for that period of time.

In a refrigerated truck cargo application, two different refrigerant evaporator conditions are suggested. With ammonia as refrigerant, evaporator pressure in the vicinity of 75 to 80 psia (5.27 to 5.62 kg/sq.cm) may be desirable to supply refrigeration at temperatures just above freezing (to assure no icing of evaporator coils for comfort air-conditioning), and a second evaporator pressure for the frozen cargo evaporator operating at a selected sub-freezing condition, perhaps 30 psia (2.1 kg/sq.cm) to yield refrigeration at near 0° F. (−17.7° C.) to maintain frozen cargo in its frozen state. For transport of chilled beverages that require assurance of no freezing conditions (milk, draft beer, etc.), both cargo and comfort air-conditioning might employ the same evaporator pressure.

BRIEF DESCRIPTION OF THE DRAWINGS

The invention will now be described in greater detail with reference to the accompanying drawings wherein.

DETAILED DESCRIPTION

Examples of embodiments of the invention in a truck engine application involving both comfort air-conditioning of the driver's compartment and refrigeration for the cargo will now be described.

In these examples it is assumed that generator heat input will be derived from engine exhaust heat, and refrigerant condensation and absorber cooling will be supplied by ambient air via air-cooling radiation (finned heat exchangers).

The comfort air-conditioning refrigeration cycle will employ an evaporator operating at 70 psia (4.92 kg/sq.cms). The cargo refrigeration system will employ an evaporator operating at 30 psia (2.1 kg/sq.cm). Both employ a common generator operating temperature of 350° F. (176° C.) at an operating pressure of 375 psia (26.4 kg/sq.cm). The absorber and condenser cooling temperature will be 160° F. (71° C.) created by passing ambient air through finned tube heat exchangers with the circulating fluids to be cooled flowing therethrough (i.e. air-cooled radiator types).

Comfort air-conditioning cycle state conditions become:

Generator conditions: P=375 psia (26.37 kg/sq.cm); T=350° F. (176° C.)
   weak aqua solution concentration: 0.12%
A/C Absorber conditions: P=70 psia (4.92 kg/sq.cm); T=160° F. (71° C.)
   strong aqua solution concentration: 0.314%
   (where P represents the internal operating pressure of the respective vessels)

For these conditions, 4.536 lbs (2.058 kg) of strong aqua solution will be in circulation in the cycle per pound (0.454 kg) of ammonia refrigerant delivered to the evaporator of the comfort air-conditioning system. Approximately a third of a pound (0.15 kg) of ammonia refrigerant flow per minute are required per ton of refrigeration desired.

Cargo refrigeration is being concurrently supplied from the same generator, but the cargo absorber unit will be operating at: Cargo Absorber conditions: P=30 psia 2.1 (kg/sq.cm); T=160° F. (71° C.) strong aqua solution concentration: 0.183% and 6.237 lbs (2.83 kg) of strong aqua solution must be circulated per pound (0.454 kg) of ammonia refrigerant supplied to the cargo refrigeration evaporator.

One possible arrangement of such an embodiment, in conjunction with a truck tractor driven by an automotive diesel engine, is to install the generator in association with one or both of the truck exhaust pipes at the rear of the tractor. This unit would receive the mixture of strong aqua solution from the comfort air-conditioning system absorber and the strong aqua solution from the cargo refrigeration system absorber both of which would have been pumped to the generator at the common generator pressure of 375 psia (26.37 kg/sq.cm). The generator will then deliver ammonia vapor at that pressure to the ammonia condenser, and will return a portion of the weak aqua solution via a pressure reducing valve at 70 psia (4.02 kg/sq.cm) to the comfort AC absorber, and the remainder via a second pressure reducing valve at 30 psia (2.11 kg/sq.cm) to the cargo refrigeration absorber.

Ammonia vapor will be condensed in the ammonia condenser by flow of ambient air, around fins on the condenser vessel, and will leave the ammonia condenser as liquid phase ammonia at a pressure of approximately 375 psia (26.37 kg/sq.cm) (minus pressure drops through equipment and piping) at a sub-cooled temperature somewhat below its saturation temperature of 139° F. (59° C.) at that pressure. From there, possibly sub-cooled farther enroute to the two absorbers, the liquid ammonia refrigerant flow is "split" to separate a portion flowing to the comfort AC evaporator where it is released through a pressure-reducing valve to drop its pressure to 70 psia (4.92 kg/sq.cm) to produce refrigerating effect at a temperature of 37.6° F. (3.1° C.) just above freezing, while the remaining portion flows to the cargo evaporator where it enters via a second pressure-reducing valve to drop its pressure to 30 psia (2.11 kg/sq.cm) and produce refrigeration at a −0.67° F. (−22° C.) temperature to maintain a cargo of frozen food in safe condition throughout its trip. Evaporators presented in these examples are assumed to be dry expansion types. Unlike flooded or wet expansion evaporators requiring control of liquid refrigerant levels in the evaporator, dry expansion evaporators function with an undetermined liquid level and are commonly employed in limited space under conditions of motion (viz.—boats, trains, etc.).

Returning vapor from the comfort A/C evaporator flows to the A/C absorber to recombine with weak aqua from the generator at 70 psia (4.92 kg/sq.cm) pressure, and returning vapor from the cargo refrigeration evaporator flows to the cargo refrigeration absorber where it combines with weak aqua from the generator at a pressure of 30 psia (2.11 kg/sq.cm). From the two absorbers, the strong aqua solutions formed in each are pumped to a pressure of 375 psia (26.37 kg/sq.cm) to be recombined in the generator to repeat the cycle.

An analogous system, devoid of the division of ammonia condenser liquid refrigerant flow to two separate evaporators and eliminating the cargo absorber, would result in a system designed solely to produce comfort air-conditioning for operator and passengers. The heat source supplying the generator could as well be exhaust from a gasoline engine as that of the diesel engine described in the example. Such a system actually might describe a passenger vehicle comfort A/C system with cargo refrigeration components deleted. For urban vehicle service, it might remain susceptible of a shortage of exhaust mass flow heat supply during long idling periods, traffic jams, etc. beyond reasonable expectations of compensation by carrying a reasonable sized refrigerant surge tank supply.

Freight carrying truck-trailers and intercity buses avoid or minimize adverse effects affecting utility of the system in densely urbanized service.

For truck cargo refrigeration application, an embodiment may be a system not requiring quick disconnect lines running between the tractor and the trailer carrying ammonia refrigerant itself. Another embodiment of AAR to deliver refrigeration at two different temperatures employs an intermediate refrigeration fluid as thermodynamic medium circulating between the evaporator and heat exchangers absorbing heat from the refrigerated space(s). Such systems are common in buildings where chilled water is produced by centralized refrigeration units, and the chilled water becomes coolant medium circulated to fan coil units where the air is cooled. In the vehicular embodiment, the circulating intermediate medium must be capable of being circulated at below freezing temperatures, suggesting use of one of the "anti-freeze" liquids commonly available. Among those most readily available at vehicle service facilities are various compounds employing ethylene glycol or one of the alcohols as non-freezing thermodynamic media.

In such embodiments, it is possible to simplify supply of refrigeration at two different temperatures by selection of a point within the system through which the intermediate fluid is passing in the process of being cooled at which it has arrived at the desired higher temperature refrigeration for passenger comfort (just above freezing). There, a portion of the total intermediate fluid flow is diverted to an intermediate exit point from the cooling process to supply passenger comfort A/C service, while the remainder continues through the evaporator, becoming colder as it proceeds, to arrive at desired sub-freezing refrigeration temperature to supply frozen cargo needs. Use of this intermediate coolant fluid method lends itself to simple safe quick disconnect attachment between tractor and trailer when the trailer must be dropped or picked up, with no risk of refrigerant leakage in the process. Make-up needs to replace minor losses of ethylene glycol fluids can readily be supplied at most vehicle service facilities.

Figure 1:
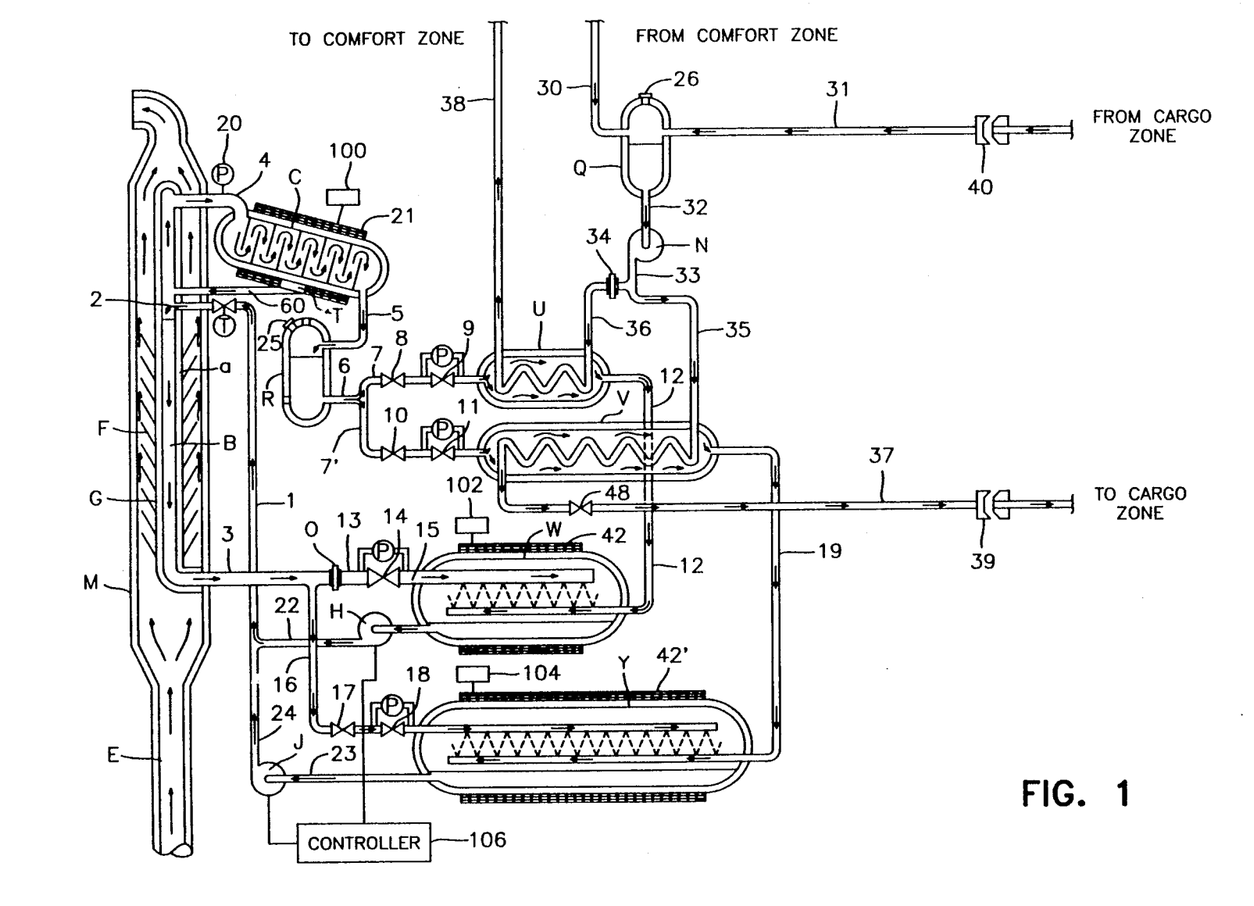
FIG. 1 is a schematic flow diagram of an embodiment of the refrigeration system of the invention.
Figure 2:
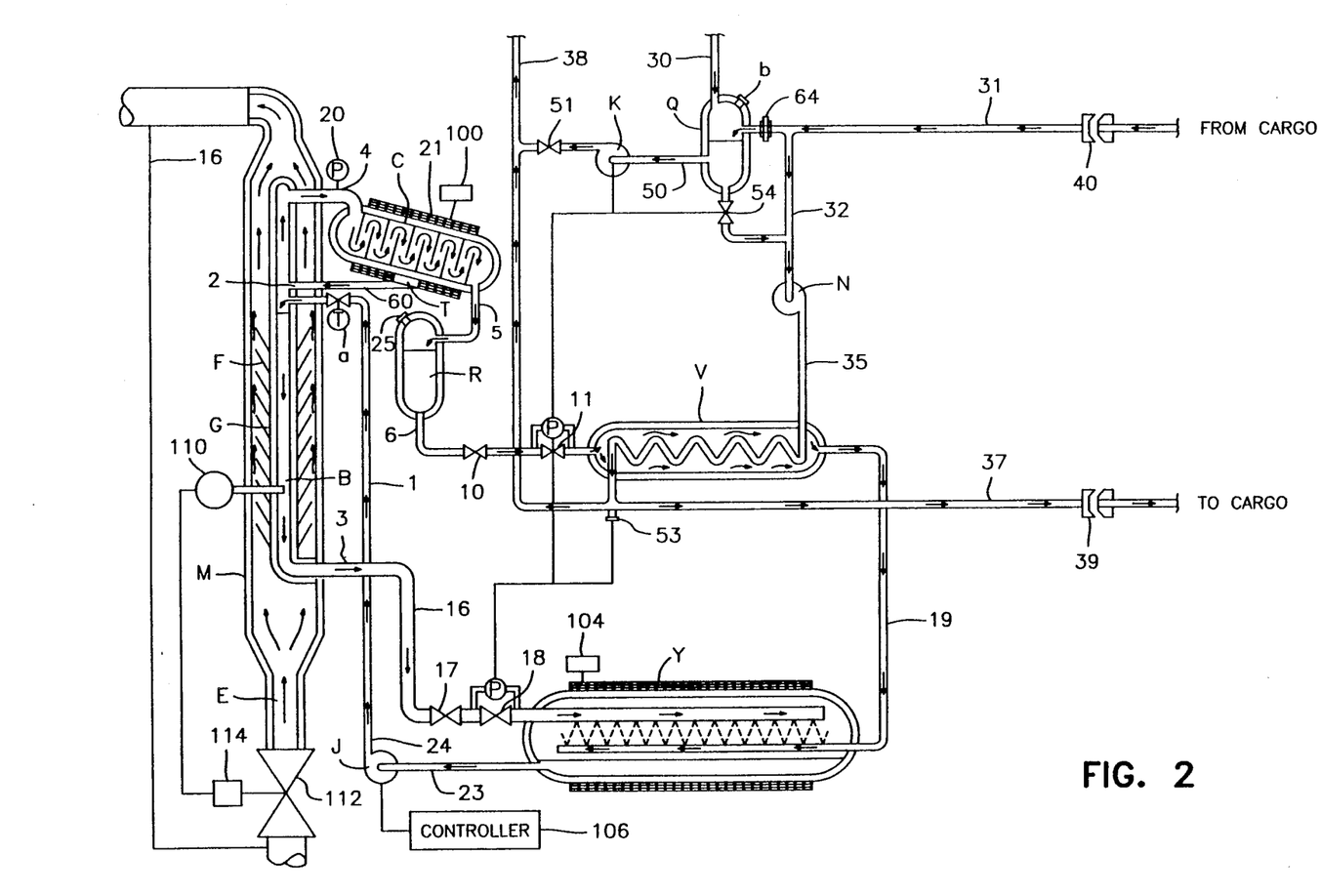
FIG. 2 is a view similar to FIG. 1 of a second embodiment of the invention wherein only a single evaporator and a single absorber are utilized.

With reference to FIGS. 1 and 2, both of which employ similar generator arrangements, engine exhaust leaving the exhaust manifold of the motor (and catalytic converter system) is commonly piped to a muffler mounted toward the rear of the truck tractor. Where the muffler might normally be installed, the exhaust stream enters what is now the generator assembly housed within vessel M, of a vehicular absorption refrigeration system, via conduit E. The exhaust stream flows around the exterior of the AR system generator vessel G, where it transfers heat from the exhaust stream via fins F on vessel G in the boiler zone B of generator G. That portion of the generator receives a supply of strong aqua solution from the absorber(s) via conduit 1. Supply of strong aqua solution via conduit 1 is controlled by valve a, a thermostatically controlled valve sensing the temperature being developed in the boiler section and also capable of being remotely closed by the operator desiring to shut down the AR system. Strong aqua solution admitted by valve a via conduit 2 enters the generator boiler section where it is heated by the surrounding exhaust stream via heat transfer fins F to the desired temperature yielding ammonia vapor at the intended pressure of the generator (in the cycle example presented, a pressure of 350 psia [26.4 kg/sq.cm] and a temperature of 350° F. [176° C.]). Vapor leaving the boiler rises to exit via conduit 4. A pressure relief valve 20 is shown at the exit conduit as a safety device to prevent development of an over-pressure condition.

From conduit 4, ammonia vapor enters air-cooled condenser C equipped with fins 21 for air-cooling illustrated as surrounding the vessel. As the vapor cools, the first condensate fraction contains most of the partial pressure of water vapor that left the generator together with ammonia vapor. As the vapor mixture condenses, the water vapor fraction is trapped out at trap T as a highly concentrated aqua solution which drains, via conduit 60, back to the generator as reflux input to the boiler. The remaining ammonia vapor continues being cooled as it passes down through condenser C, leaving as condensed liquid ammonia refrigerant via conduit 5.

The liquid refrigerant, now sub-cooled below saturation temperature at the 350 psia generator pressure, enters refrigerant surge tank R. The surge tank assures a supply of liquid ammonia refrigerant to respond to demands signalled by opening of liquid refrigerant conduits having pressure-reducing valves providing access to the evaporator(s). A make-up filler cap 25 on the surge tank provides means of supplying additional refrigerant as needed to make-up refrigerant leakage losses that might occur in service. Make-up refrigerant must be added under pressure to permit it to enter the filler opening via its check-valve protected opening.

Figure 3:
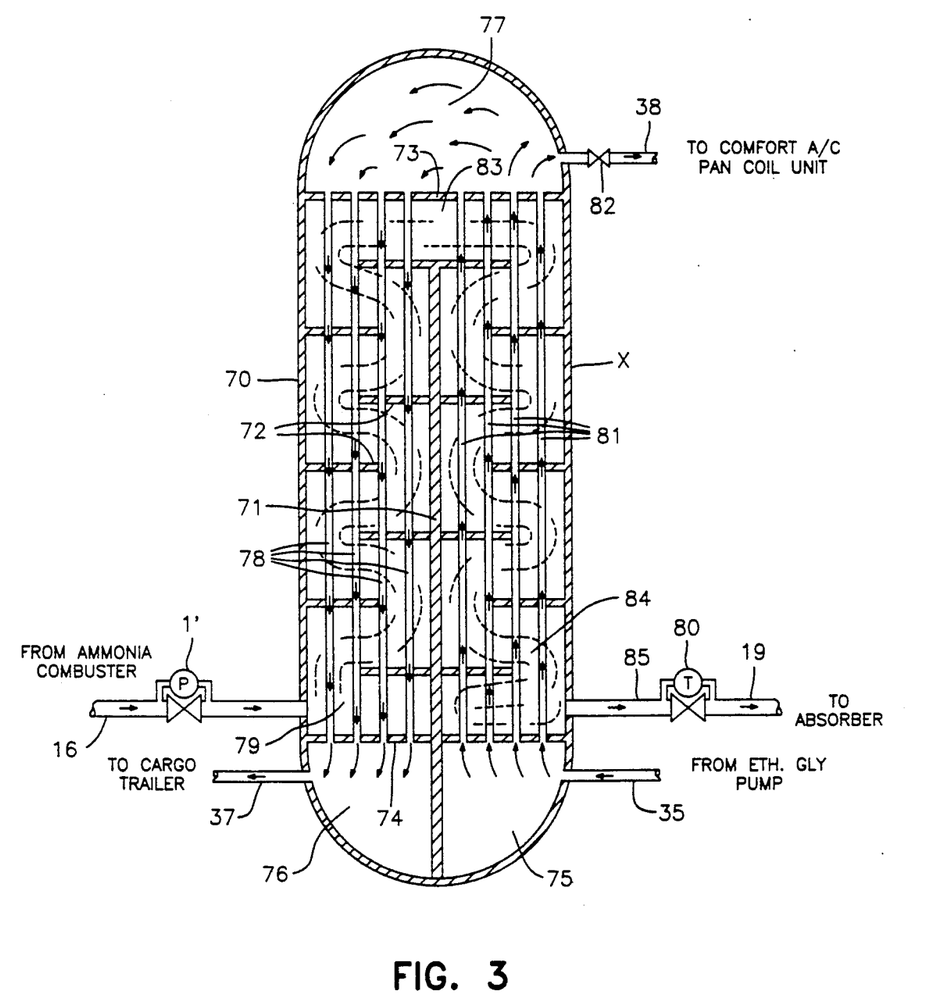
FIG. 3 is a schematic cross-sectional view of a further embodiment employing a single evaporator and absorber to obtain the advantages of the embodiment of FIG. 2.

The description of the operation of generator and condenser components of the system is the same in embodiments illustrated in FIGS. 1, 2 and 3.

However, the common generator and condenser portions of the AAR system of the figures illustrate different approaches to embodiments yielding dual-temperature refrigeration effects by an AAR vehicular refrigeration system.

FIG. 1 embodies a system employing two independent absorbers and evaporators each operating on cycles intended to produce a desired refrigeration temperature completely independently of whatever the other is doing. Liquid refrigerant from refrigerant surge tank R enters conduit 6 where its flow divides to supply conduit 7 whence it flows via control valve 8 to pressure-reducing valve 9 set to supply refrigeration for comfort air-conditioning by dropping the generator pressure from 350 psia to 70 psia (4.92 kg/sq.cm) yielding refrigeration in evaporator U at a temperature of 37.6° F. (3.1° C.), slightly above freezing to prevent icing of cooling coils in the AC unit. The remaining portion flows via conduit 7 to control valve 10 and pressure-reducing valve 11 set to supply cargo refrigeration by dropping the pressure to 30 psia (2.11 kg/sq.cm) yielding refrigeration in evaporator V at a temperature of $-0.67°$ F. ($-22°$ C.) to maintain the cargo at a sub-freezing temperature.

Ammonia vapor leaving evaporator U via conduit 12 at a pressure of 30 psia enters absorber W also operating at a pressure of 30 psia to combine with weak aqua solution returned from the generator via conduit 3 where the fraction needed to supply the AC system is separated via orifice O to supply absorber W via conduit 13 to pressure-reducing valve 14 where its pressure is reduced to 70 psia to match returning ammonia vapor pressure entering absorber W via conduit 15 at that pressure.

That fraction of the weak aqua solution leaving the generator via conduit 3 which was not separated off to supply comfort air-conditioning continues flowing via conduit 16, control valve 17, and thence via pressure-reducing valve 18 which reduces the pressure to 30 psia to match the pressure of returning refrigerant vapor at that pressure coming via conduit 19 from evaporator V. (Control valve 17 is also able to shut off flow to cargo refrigeration absorber Y when no cargo is attached requiring refrigeration flow triggered by back-pressure from the act of uncoupling the quick-disconnect coolant flow pipe to the trailer.)

In response to temperature sensed by sensor 46 at the exit coolant flow from evaporator V, control valve 48 modulates flow of coolant to the cargo at the appropriate temperature.

As returning ammonia vapor and weak aqua solutions mix in their respective absorbers, strong aqua solution is reformed. Heat evolved in the absorbers during this process is rejected to ambient air flowing past the vehicle via cooling fins 42, 42[1] surrounding the absorber vessel exteriors as illustrated in the figure. Strong aqua solution leaving absorber W via conduit 21 enters pump H which raises the pressure of the solution from 70 psia to the 350 psia generator operating pressure, discharging the flow via conduit 22. At the same time, strong aqua formed in absorber Y leaves via conduit 23 to pump J which raises the pressure from 30 psia to the same 350 psia generator pressure before discharging the flow to conduit 24. Combined flows from conduits 22 and 24 join in conduit 1 at their now common pressure of 350 psia to become the strong aqua solution feed supplied via control valve a to the generator to repeat the cycle.

In these examples, actual refrigeration is delivered by using the evaporators to chill a coolant liquid being circulated to the places where cooling effect is desired. Since cooling must be accomplished at temperatures both above and below freezing, ethylene glycol has been chosen as the coolant medium. That coolant is supplied from a coolant reservoir tank Q which receives coolant returned from the comfort AC fan/coil unit via conduit 30 and returned from the cargo cooling supply hose via conduit 31. Filler cap 26 is furnished on tank Q to provide means of maintaining fluid volume needed should some be lost due to leakage and to serve as a surge tank should demand for more coolant flow vary in response to refrigeration load, and/or to compensate for fluctuations in supply of refrigerant received from the condenser at varying rates corresponding to fluctuations in heat received by the generator under varying engine loadings on the truck motor.

Coolant from tank Q leaves via conduit 32 to coolant circulating pump N which pumps it through the system via conduit 33. A portion of the flow is separated via orifice 34 to supply the comfort AC flow rate required while the remainder flows via conduit 35 to the cargo evaporator. The separated flow leaving orifice 34 flows via conduit 36 to the AC evaporator.

After being cooled in the cargo evaporator, coolant now at sub-freezing temperature flows via conduit 37 and quick-disconnect hose connection 39 to the cargo trailer whence it supplies the trailer refrigeration system. After delivering refrigeration to the cargo, coolant from the trailer returns via the second quick-disconnect hose fitting 40 to conduit 31 thence to tank Q for recirculation.

Similarly coolant chilled to the appropriate temperature of comfort AC use flows via conduit 38 to the fan coil unit in the driver's compartment for AC use. Return flow from the fan-coil unit flows via conduit 30 back to tank Q.

While illustrated as a system in which an intermediate coolant such as ethylene glycol is being employed as a safe means for permitting quick disconnect between tractor and trailer without handling ammonia refrigerant itself in flexible lines between vehicles, both the cargo evaporator V and its associated absorber Y can be located in the trailer, and the line with the quick disconnect arrangement may be inserted in liquid ammonia line 7' leaving the condenser C to supply the cargo evaporator located in the trailer. Strong aqua return line 23 from the cargo absorber becomes the return suction line 23 with the quick disconnect to return strong aqua from the trailer-mounted absorber to pump J. With such an arrangement, ammonia refrigerant may be employed directly in cargo refrigeration without resort to use of an intermediate coolant between refrigerant and refrigeration load (also eliminating loss of two approach difference losses made available to further lower cargo refrigeration temperature). However, it is necessary to handle ammonia in a high pressure flexible pipe connecting the two vehicles. This concern is not present in a single vehicle cargo truck. While each of the sub-systems supplying different required cooling temperatures in the embodiment illustrated in FIG. 1 is completely independent after sharing common generator and condenser components, permitting either system to be turned on or off at will, and/or to be located in either of the two vehicles at will, it will be apparent to those familiar with the art that any intermediate coolant intended to maintain a cooling temperature below freezing cannot absorb heat below freezing beyond the point at which it becomes near freezing temperature itself (actually not above the minimum approach difference below freezing, leaving its temperature probably about 20° F. or −6.66° C.).

Since cargo refrigeration demand of the total refrigeration delivered by the integrated system is generally larger than comfort air-conditioning demand, the mixture of sub-freezing return coolant via conduit 3 with above-freezing smaller flow returned via conduit 30 to tank Q will frequently result in the coolant supply leaving tank Q already being at, or nearly at, required coolant supply temperature to supply conduit 38, with no additional cooling required in evaporator U. Under such circumstances, evaporator U has no function as long as evaporator V is operating. Conversely, if the only time evaporator cooling of the comfort AC supply is needed independently occurs when there is no cargo refrigeration concurrent requirement, a condition exists in which only a single evaporator and its associated absorber are required to be in service at one time.

FIG. 2 illustrates an embodiment in which advantage is taken of that mutually exclusive requirement by a system employing only a single evaporator and a single absorber, but which nevertheless is able to supply the two required cooling temperatures as needed whether concurrently or separately. The same generator G, condenser C, refrigerant surge tank R, and engine exhaust arrangements illustrated in FIG. 1 remain unchanged in FIG. 2. However, the entire liquid ammonia refrigerant flow leaving refrigerant surge tank R now flows via conduit 6 directly to control valve 10 and thence via pressure reducing valve 11 to evaporator V. When cargo refrigeration is required, control valve 11 remains set to deliver refrigerant vapor at a pressure of 30 psia, the pressure required to produce the sub-freezing cargo refrigeration supply. Under these conditions the entire pressure-reducing valve setting, evaporator V functions, and absorber Y functions previously described for FIG. 1 remain unchanged, and pump J returns the strong aqua formed in absorber Y via conduit 24 which becomes conduit 1 with no other flows added enroute.

However, the portion of return coolant flow from the cargo via conduit 31 still at a temperature below freezing, and needed to produce the mixture with return warmer coolant from the AC fan/coil unit via conduit 30 that will yield the required 38±° F., is metered from total cargo coolant return flow via orifice 64 and mixed in tank Q. The mixture leaves tank Q via conduit 50 to AC circulating pump K which circulates it past check valve 51 to conduit 38 to supply the fan/coil unit for comfort AC service. The remaining cargo coolant return supply, that was not diverted via the orifice to comfort AC service, continues via conduit 32 to circulating pump N for circulation via evaporator "V" whence it is directed by the setting of two-way valve 53 to supply cargo refrigeration required via conduit 37. Valve 54 drains the same amount of fluid from tank Q back to the pump N supply line 32 as was diverted into tank Q via orifice 64, thereby maintaining the same total coolant volumes circulating in each of the cooling circuits.

When cargo refrigeration is disconnected (viz.—by opening the quick-disconnect hose fittings 39, 40), pump K is stopped, valve 54 opens completely, pressure reducing valves 11 and 18 are automatically reset for 70 psia (comfort air-conditioning setting performed by pressure-reducing valves 9 and 14 in FIG. 1), and two-way valve 53 is switched to redirect coolant flow from evaporator V from cargo connection conduit 37 to conduit 38, the AC supply. The entire system has become a comfort AC supply only, with no sub-freezing coolant circulation being produced anywhere. Check valve 51 prevents back pressure from short-circuiting flow by slipping past pump K back through to mixing tank Q. What had been the circulating pump supplying cargo coolant circulation, pump N, has replaced the function of circulating pump K for the comfort AC system.

FIG. 3 illustrates an embodiment employing a single evaporator to obtain the advantages of the embodiment in FIG. 2, while leaving ability to select either or both refrigeration temperatures at will, and avoiding need for an additional alternate solution circulation pump (pump K in the FIG. 2 embodiment) to be available when one or the other, but not both, refrigeration temperatures are desired.

The new evaporator X illustrated is in the form of a shell-and-tube type heat exchanger commonly employed as evaporators in "dry expansion" (once through) units. In this embodiment, the shell 70 is longitudinally divided into two sections by divider 71, and baffles 72 are provided to improve contact of the refrigerant flowing through the tube bundles and provide tube support. End head details have not been illustrated since these would be readily understood to a person having ordinary skill in this technology. Tube bundles 78 and 81 terminate in tube sheets 73 and 74 which create two chambers 7 and 76 at the intermediate coolant medium entry and exit, and a cross-over chamber 77 from which some of the intermediate coolant may be withdrawn via conduit 38 before the remainder continues to pass through second tube bundle 78. Refrigerant supplied from the ammonia condenser as a high-pressure liquid as before via conduit 16 enters the shell side of the heat exchanger via pressure reducing valve 11 to the area 79. Reduced pressure leaving expansion valve 11 establishes desired evaporator pressure, and a thermal expansion valve 80 maintains constant superheat leaving the evaporator.

As liquid ammonia refrigerant exits expansion valve 11, it undergoes isothermal phase change to a vapor during which it absorbs its heat of vaporization from counterflowing intermediate thermodynamic medium on the tube side in tubes 78 (the ethylene glycol). At some point along its travel, all refrigerant liquid has vaporized, and the vapor begins to absorb additional heat from counterflowing intermediate medium in tubes 78 and 81, acquiring the intended superheat condition controlling its exit via conduit 85 and thermal expansion valve 80. Counterflowing intermediate medium (ethylene glycol) enters evaporator chamber 75 via conduit 35 and flows into tube bundle 81 at the hot end of the shell region 84. It enters at the exit temperature it left surge tank Q as the mixture returning from the comfort A/C fan coil unit and the cooling system of the cargo. Being a liquid, its rate of temperature decline as it passes through the evaporator will not involve a phase change, and will simply reflect the specific heat of the liquid delivered to the expanding and superheating refrigerant on the other side of the tubes. Along that route of travel, its temperature will be progressively dropping from entry condition to flow splitting chamber 77, at which its temperature will have become that required for the A/C supply. That amount of cooling, in this portion of the flow circuit, may be selected by appropriate choice of the number and sizes of tubes in bundle 81.

Mass flow required to supply comfort cooling is divided from total flow passing through tube bundle 81, and that portion, controlled by valve 82, is diverted via conduit 38 to the AC fan coil unit supply line, while the remainder continues through remaining tube bundle 78 acquiring intended coolant temperature to supply the cargo compartment of the trailer, about $-20°$ F. ($-26.6°$ C.). It leaves tube bundle 78 into chamber 76 whence it exits the evaporator via conduit 37 as before, connecting to the quick-disconnect fitting (39 in FIG. 2) via which it is supplied to the trailer.

In FIG. 3, the hot end for the intermediate coolant entry is at chamber 75, the intermediate coolant temperature is reached in chamber 77 from which comfort air-conditioning is supplied, and coolant exits its cold end from chamber 76 at the required cargo sub-freezing temperature. Counterflowing ammonia refrigerant is supplied at its cold end in space 79, and, as it vaporizes, it flows around tube bundle 78 over baffles 72 becoming dryer as it absorbs heat from tube bundle 78, arriving at cross-over chamber 83 at the point at which counterflowing intermediate ethylene glycol in the tubes is at an intended temperature for supplying comfort air-conditioning. As refrigerant vapor continues to flow around the tube bundle 81, it passes through the completely dry and saturated condition and begins acquiring the intended superheat condition for which thermal valve 80 has been set, the hot end of the evaporator for the refrigerant.

Thus in the embodiment of FIG. 3, a single evaporator supplies two selected refrigeration temperatures, and both temperatures and refrigeration capacity supplied at each may be controlled by the means illustrated.

Most truck tractors in current use have dual exhaust systems. This offers a convenient mechanism for controlling quantity of heat made available to the generator G shown in FIGS. 1 and 2, and is related to the vehicle exhaust system prior to its arrival at conduit E. A flow-splitter 112 installed between the two exhaust pipes can divert exhaust flow from the engine leaving via the exhaust pipe that does not supply the generator to the one that does, when need for an increase in input heat is sensed by an appropriate sensor. It may similarly by-pass through by-pass tube 116 (FIG. 2) a portion of the flow entering conduit E when less heat is needed, to become part of the exhaust flow travelling to the exhaust exit channel that does not contain the generator of the AR system. This condition could exist during periods when the engine is not delivering much power, which would also be conditions in which flow rate capacity of the complete dual exhaust system is not being fully utilized. The flow-splitter 112 would itself be interlinked with a component 114 of the automated AAR control system responding to a temperature sensor 110 in the generator boiler section.

The embodiments described may be built with all required pressure reducing valves and pump capacities engineered by the manufacturer for the intended service requirements. In addition, the embodiments may also be designed to permit these components to be automated to optimize operating parameters in response to changes in ambient air cooling effect changes, changes in desired service temperatures, etc.

All pumps may be driven by electric motors, and operable valves described may be electrically operated, by electrical energy supplied from the vehicle electrical system. These may in turn respond to electrical, pressure, temperature, and flow sensing devices placed in the system where temperature, pressure, and flow volumes require adjustment to maintain intended operating conditions, with all signal processing and control signals fed being supplied from a solid state control system to permit automation of the entire process.

For example, temperature sensor 100 may be mounted on condenser C to detect the temperature of the ambient air cooling effect on the operating temperature of condenser C, and temperature sensors 102 and 104 may be mounted on the respective absorber vessels W and Y for detecting the effective ambient air cooling of these vessels. The temperature sensors are electrically connected to a controller 106 which is in turn connected to the driving means for solution pumps H and J for controlling the speed of the pumps in response to the temperatures sensed by the temperature sensors. In the operation of this system, the speed of the pumps is increased to increase the output pressure thereof in response to rising ambient air temperature and to decrease the output pressure in response to falling ambient air pressure. The controller is limited to assure that at no time is the pressure maintained in the generator vessel less than that required to assure condensation of ammonia vapor emitted from the generator vessel in the ammonia condenser vessel being cooled by the ambient air. This control means also assures that mass flow of circulating absorbent in the system is adequate to assure solution of all the mass flow of ammonia circulating in the system in the total mass flow of absorbent circulating in the system at the operating pressure of the absorber vessels at the temperature affected by the cooling air supplied to the absorbers to affect the solution temperature. Similar temperature sensors and controller means are provided for the embodiment of FIG. 2 wherein only a single evaporator and absorber unit is provided.

Operator selection of the desired cargo refrigeration temperature via the controller automatically selects the pressure settings of both pressure reducing valve 11 and the corresponding setting of pressure reducing valve 18 in FIG. 1. In the embodiment of FIG. 3, operator selection of a desired cargo refrigeration temperature would simultaneously control the setting of pressure reducing valve 11, and the flow tapped off via valve 82 to supply comfort air conditioning.

While not germane to explanations of operation of the absorption refrigeration systems described, those familiar with vehicle exhaust systems will be aware that in addition to consideration of dimensional details relating to provision of appropriate heat transfer surfaces in the generator to effect required heat input, the length of containment M, and the arrangement of fins within it to facilitate heat transfer, must also take into consideration: minimizing exhaust back pressure on the engine (which can adversely affect engine performance); providing required silencing muffler function; and selection to optimize tuned exhaust dimensions to improve power output of the engine.

Utility will be affected by the amount and location of thermal insulation around the cargo space and the occupant space. Extent of glass areas become a major source of heat input for passenger comfort considerations. At present, "typical" automobiles employ air-conditioning systems capable of delivering about five tons of refrigeration. Intercity buses in the forty passenger size range employ about fifteen tons of refrigeration. These numbers suggest that the AR approach would be easily capable of delivering that peak design refrigeration capacity demand whenever the automobile engine is delivering approximately twenty horsepower output and whenever the bus engine is delivering approximately fifty-five to sixty horsepower.

The frequency with which peak capacity is required may actually suggest broader utility of such systems than concern with occasional short term inconvenience resulting from "worst case" occurrences, particularly when the present alternative consumes an additional minimum of 15% fuel demand *all the time* the refrigeration system operates.

Based on analysis of United States temperature variations, for reliable year-round service in any climatic region of the United States, the lowest generator operating pressure for an AAR cycle must be supplied with not less than 260 psia (18.28 kg/sq.cm) strong aqua inlet pressure from the solution pump to assure condensation of the refrigerant vapor by ambient air flow with year-round reliability, regardless of intended refrigeration temperature to be established by evaporator and absorber operating pressures. Higher generator operating pressures may be required to maximize the differential in solution concentrations between that of the generator at the peak temperature selected for its operation, and the solution concentration resulting from selection of evaporator pressure to produce desired refrigeration temperature. The solution concentration that forms at that pressure in the absorber is similarly limited in its minimum operating temperature by the temperature to which it may be cooled by ambient air temperatures reliably available.

Automated control systems operating on feed-back sensors located at strategic points along the system may take advantage of existence of other than "worst case" ambient air temperature conditions. While 110° F. (43.5° C.) may be a fair criterion for "worst case" ambient air cooling, most days and many nights will offer ambient air cooling, for use by ammonia condensers and absorbers, 30° F. (16.7° C.) colder, even in summer, particularly for long-distance trucking which commonly operates at night. While perhaps not as significant in comfort air-conditioning applications when demand for air-conditioning might not be as great, in cargo refrigeration applications opportunities may take additional advantage of even colder ambient air conditions in fall and winter months.

Under such conditions, a temperature sensor detecting the effect of ambient air temperature may be used to control a variable speed motor driving the strong aqua pump to reduce operating pressure of the generator and condenser (and thereby reduce parasitic power consumption for operation of the pump), or to reduce mass flow of solution in circulation by taking advantage of higher solution concentrations that may be formed in absorber(s) at lower operating temperature (again to reduce parasitic power demand to operate the solution pump for the same amount of refrigeration capacity evolved).

The foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Therefore, it is to be understood that the invention is not limited to the disclosed embodiments but may be practiced within the full scope of the appended claims.

I claim:

1. An automotive ammonia absorption refrigeration system comprising: a generator vessel in heat exchange relationship with at least one exhaust conduit from a vehicle engine exhaust system for heating refrigerant in said generator vessel by exhaust gas; first conduit means connected to said generator vessel for introducing into said generator vessel strong ammonia/water refrigerant solution returned from at least one absorber vessel; at least one refrigerant solution pump means having an outlet connected to said first conduit means and an inlet connected to said at least one absorber vessel, and having a minimum output capacity to produce at least a minimum of 260 psia operating pressure in said generator vessel; second conduit means connected to said generator vessel for removing ammonia vapor separated from said solution in said generator vessel; third conduit means connected to said generator vessel for removing weak ammonia/water solution residue from said generator vessel after ammonia refrigerant vapor has been separated from said strong ammonia/water refrigerant solution; an ammonia condenser vessel connected to said second conduit means for receiving ammonia vapor from said generator vessel at generator operating condition pressure, said condenser vessel being in heat exchange relationship with ambient air flow providing cooling to carry off at least the combination of vapor superheat and latent heat of condensation rejected from ammonia vapor in said condenser vessel to effect condensation of the ammonia vapor to the liquid phase thereof; fourth conduit means for delivering condensed liquified ammonia refrigerant from said condenser vessel to an inlet of at least one evaporator pressure-reducing valve; at least one evaporator pressure-reducing valve connected to said fourth conduit means for reducing pressure of the liquid refrigerant entering from said condenser vessel to saturation pressure of ammonia at the desired refrigerating temperature; at least one evaporator vessel for containing said refrigerant in heat exchange relationship with coolant fluid to be refrigerated by absorption of the heat of vaporization of ammonia liquid from said coolant fluid; fifth conduit means connecting said at least one evaporator pressure reducing valve to said at least one evaporator vessel for supplying liquid ammonia refrigerant at said reduced pressure to said at least one evaporator vessel; a first inlet in said at least one evaporator vessel into which reduced pressure ammonia from said at least one evaporator pressure-reducing valve is admitted via said fifth conduit means; a first outlet in said at least one evaporator vessel through which ammonia vapor produced therein exits said at least one evaporator vessel; sixth conduit means connected to said first outlet in said at least one evaporator vessel; at least one absorber vessel having a first inlet connected to said sixth conduit means for admission of ammonia vapor from said at least one evaporator vessel, and a second inlet connected to said third conduit means for admission of said weak water/ammonia solution from said generator vessel through an at least one absorber pressure-reducing valve, so that said at least one absorber vessel mixes the two fluids therein at a common pressure, said at least one absorber vessel being in heat exchange relationship with a flow of ambient air adequate to remove heat energy evolved as a result of loss of specific heat of said ammonia/water solution rejected as its temperature lowers, the heat of mixing evolved as ammonia vapor enters solution in said weak ammonia/water solution, and the latent heat evolved as ammonia vapor assumes a liquid phase condition in the evolving strong ammonia/water solution formed in said at least one absorber vessel, the contents of said at least one absorber vessel being operated at a pressure consonant with the associated evaporator pressure; seventh conduit means connected to said at least one absorber vessel for conducting strong aqua solution from said at least one absorber vessel to said at least one solution pump means so that said at least one solution pump means pumps the strong aqua solution formed in said at least one absorber vessel to said generator vessel at said pressure not less than 260 psia; means for driving said at least one refrigerant solution pump means; coolant circuit means for conducting said coolant fluid through said at least one evaporator vessel for cooling said coolant fluid therein and through a comfort zone cooling means in a comfort zone at one temperature and through a cargo storage zone cooling means in a cargo zone for cooling cargo therein at a second temperature lower than said comfort zone temperature; and control means for safe operation of the system and maintaining intended operating pressures and temperatures in the system.

2. The system as claimed in claim 1 wherein: said at least one evaporator vessel comprises a first and second evaporator vessel; said at least one evaporator pressure-reducing valve comprises a first and a second evaporator pressure-reducing valve connected respectively to said first and second evaporator vessels, said first evaporator pressure-reducing value having a minimum output pressure of approximately 70 psia and said second evaporator pressure-reducing valve having an output pressure at the saturation pressure associated with the desired refrigeration temperature of said coolant fluid flowing through said second evaporator vessel; said at least one absorber vessel comprises a first and a second absorber vessel; said at least one absorber pressure-reducing valve comprises a first and a second absorber pressure-reducing valve connected respectively to said first and second absorber vessels; said sixth conduit means comprises respective conduits between respective first outlets of said first and second evaporator vessels and respective first inlets of said first and second absorber vessels, the pressure of said fluid in said conduit between said first evaporator vessel and said first absorber vessel being approximately 70 psia; said at least one refrigerant solution pump means comprises a first refrigerant solution pump having an inlet connected to said first absorber vessel, and a second refrigerant solution pump having an inlet connected to said second absorber vessel; and further comprising flow splitting valve means in said third conduit means for splitting said weak ammonia/water solution flow from said generator vessel into a first and a second flow portion flowing respectively to said first and second absorber pressure-reducing valves; flow splitting means in said fourth conduit means for splitting the liquid ammonia refrigerant flow therein into first and second stream flow portions flowing respectively to said first and second evaporator pressure-reducing valves; said coolant circuit means comprising first coolant flow conduit means extending through said first evaporator vessel in heat exchange relationship with said refrigerant therein and through said comfort zone cooling means, and second coolant flow conduit means extending through said second evaporator vessel in heat exchange relationship with said refrigerant therein and through said cargo storage zone cooling means.

3. The automotive absorption refrigeration system as claimed in claim 1 wherein said control means comprises: respective temperature sensing elements on said ammonia condenser vessel and on said at least one absorber vessel for sensing the temperature induced by ambient air cooling of said ammonia condenser vessel and said at least one absorber vessel; controller means operatively connected to said temperature sensing elements for responding to signals emitted by said temperature sensing elements and operatively connected to said driving means for said at least one refrigerant solution pump means for adjusting the speed thereof to increase the output pressure delivered thereby in response to rising ambient air temperature and to decrease said output pressure in response to falling ambient air temperature, said controller being limited to assure that at no time is the pressure maintained in said generator vessel less than that required to assure condensation of ammonia vapor emitted from said generator vessel in said ammonia condenser vessel being cooled by ambient air, and to assure that mass flow of circulating refrigerant in the system is adequate at the operating pressure.

4. The system as claimed in claim 2 wherein: said second evaporator pressure-reducing valve is adjustable; means are provided for adjusting said second evaporator pressure-reducing valve to control the output pressure of said refrigerant therefrom entering said second evaporator for controlling the refrigeration temperature in said cargo zone; said second absorber pressure-reducing valve is adjustable; and means are provided for adjusting said second absorber pressure-reducing valve to control the output pressure thereof for simultaneously adjusting the pressure of the weak ammonia/water solution entering said second absorber vessel simultaneously with adjustment of said second evaporator pressure-reducing valve.

5. The system as claimed in claim 1 and further comprising: thermostatic sensor means for detecting the temperature of the refrigerated volume of said coolant being cooled in said at least one evaporator vessel for thermostatically controlling the desired amount and temperature of refrigerating effect produced by said at least one evaporator vessel.

6. The system as claimed in claim 1 and further comprising: a lubricating oil heat exchanger means in said first conduit means and operatively connected with an engine lubricating oil conduit means for conducting engine lubricating oil through said lubricating oil heat exchanger means in heat exchange relationship with said strong ammonia/water refrigerant solution flowing to said generator vessel, so that heat from said engine lubricating oil is transferred to said strong ammonia/water refrigeration solution entering said generator vessel.

7. The system as claimed in claim 1 for use on a tractor trailer truck wherein: said cargo zone is located in said trailer and said comfort zone is located in said tractor; said ammonia condenser vessel is mounted on said tractor; said at least one evaporator pressure-reducing valve and said at least one evaporator vessel are mounted on said trailer; said at least one absorber pressure-reducing valve and said at least one absorber vessel are mounted on said tractor; said fourth conduit means comprises a flexible conduit having a disconnectable coupling thereon; and said sixth conduit means comprises a flexible conduit having a disconnectable coupling thereon.

8. The system as claimed in claim 1 for use on a tractor-trailer truck wherein: said coolant in said coolant circuit means is selected from the group consisting of an intermediate low freezing-point liquid and a refrigerant brine; said refrigeration system is mounted on said tractor; and said coolant circuit means further comprises flexible cargo zone coolant conduit means for conducting coolant between said at least one evaporator vessel and said cargo storage zone, disconnectable coupling means in said flexible conduit means between said truck and said trailer, coolant pump means for pumping said coolant through said flexible cargo zone coolant conduit means, and drive means for said coolant pump operated by one of the tractor electrical system and tractor engine shaft.

9. The system as claimed in claim 8 wherein said flexible coolant conduit means comprise insulated conduits for conducting sub-freezing coolant fluid therein without icing of said conduits.

10. The system as claimed in claim 1 wherein said control means comprises: temperature sensing means operatively connected to said generator vessel for detecting the temperature of said refrigerant therein; an exhaust gas control valve means in said at least one exhaust conduit for controlling exhaust gas mass flow in heat exchange relationship with said generator vessel; exhaust gas valve control means for controlling the position of said exhaust gas valve; and means for operatively connecting said temperature sensing means to said exhaust valve control means for maintaining desired generator vessel operating temperature irrespective of variations in engine exhaust temperatures due to variations in operating load on said engine and variations in exhaust gas mass flow from said engine in response to changes in engine power demand; and exhaust gas by-pass means for by-passing said exhaust gas around said generator vessel in non-heat exchange relationship with said generator vessel by control of said exhaust gas valve means to control the maximum operating temperature in said generator vessel.

11. The system as claimed in claim 1 wherein said coolant circuit means comprises: a coolant reservoir for containing coolant to be circulated through said comfort zone cooling means and said cargo storage zone cooling means; a first coolant outlet in said reservoir; a second coolant outlet in said reservoir; a comfort zone coolant pump having an inlet connected to said first reservoir outlet and an outlet communicating with said comfort zone cooling means for pumping coolant directly from said reservoir to said comfort zone cooling means; a first inlet in said reservoir and a second inlet in said reservoir; a comfort zone return line communicating between said comfort zone cooling means and said first reservoir inlet; a cargo storage zone return line communicating between said cargo storage zone and said second reservoir inlet; a main coolant pump means having an inlet connected to said cargo storage zone return line and said second reservoir outlet, and an outlet connected to a coolant evaporator conduit passing through said at least one evaporator vessel in heat exchange relation with said refrigerant therein; an outlet end on said coolant evaporator conduit; first coolant flow-splitting means on said outlet end of said coolant evaporator conduit for splitting the flow of coolant to said cargo storage zone and to said comfort zone; a cargo storage zone coolant input line connected between said first coolant flow-splitting means and said cargo storage zone cooling means; a comfort zone coolant input line connected between said first coolant flow-splitting means and said comfort zone cooling means; a second coolant flow-splitting means in said cargo storage zone coolant return line for splitting the flow of coolant returning from said cargo storage zone cooling means between said reservoir and said main coolant pump means; and control means for controlling said first and second coolant flow-splitting means to control the relative temperatures in said cargo storage zone and said comfort zone by controlling relative flows of said coolant to respective cooling means in said zones.

12. The system as claimed in claim 2 wherein said coolant circuit means comprises: coolant fluid reservoir means having a first inlet, a second inlet, and an outlet; a coolant circulating pump means having an inlet connected to said reservoir outlet and a pump outlet; a flow-splitting means connected to said coolant pump outlet for dividing coolant flow between said first coolant flow conduit means, conducting coolant flow to said first evaporator vessel, and said second coolant flow conduit means, conducting coolant flow to said second evaporator vessel; said first coolant flow conduit means comprising a coolant inlet conduit between said first evaporator vessel and said comfort zone cooling means and a return conduit from said comfort zone cooling means to said first reservoir inlet; and said second coolant flow conduit means comprising a cargo zone inlet conduit between said second evaporator vessel and said cargo zone cooling means and a return conduit from said cargo zone cooling means to said second reservoir inlet, so that said comfort zone and said cargo storage zone are cooled at different temperatures.

13. The system as claimed in claim 1 and further comprising: a liquid refrigerant storage tank in said fourth conduit for receiving liquid refrigerant from said condenser means produced at a variable rate in response to variations in said generator vessel due to variations in said engine exhaust gas temperature.

14. The system as claimed in claim 1 wherein said at least one evaporator vessel comprises: evaporator container means for containing said refrigerant therein; evaporator coolant flow conduit means in said container for conducting said coolant fluid through said container in heat exchange relationship with said refrigerant therein; coolant flow-splitting valve means in said evaporator coolant flow conduit means for controlling the flow of said coolant therein so that a part of said coolant after flowing part way through said evaporator vessel is conducted to said comfort zone cooling means at approximately 40° F. and the remainder of said coolant flows through the remainder of said evaporator coolant flow conduit means for further cooling and flow to said cargo storage zone cooling means at a lower temperature.

15. The system as claimed in claim 14 and further comprising: a thermal expansion valve in said sixth conduit for maintaining constant superheat of said refrigerant leaving said at least one evaporator vessel.

16. A system as claimed in claim 1 and further comprising:
an independent vapor compression refrigeration system mounted on said vehicle and operatively connected to said cargo zone for selectively maintaining said cargo zone at an intended refrigeration temperature when said vehicle engine is not being operated to supply required exhaust gas energy to said generator vessel.

17. A system as claimed in claim 7 and further comprising:
an independent vapor compression refrigeration system mounted on said trailer and operatively connected to said cargo zone for selectively maintaining said cargo zone at an intended refrigeration temperature when said vehicle engine is not being operated to supply required exhaust gas energy to said generator vessel.

18. A system as claimed in claim 8 and further comprising:
an independent vapor compression refrigeration system mounted on said trailer and operatively connected to said cargo zone for selectively maintaining said cargo zone at an intended refrigeration temperature when said vehicle engine is not being operated to supply required exhaust gas energy to said generator vessel.

* * * * *

UNITED STATES PATENT AND TRADEMARK OFFICE
CERTIFICATE OF CORRECTION

PATENT NO. : 5,231,849
DATED : August 3, 1993
INVENTOR(S) : Joel H. Rosenblatt

It is certified that error appears in the above-identified patent and that said Letters Patent is hereby corrected as shown below:

In the drawings, sheet 3, Fig. 3, the term "PAN" at the upper right should be --FAN--; the term "COMBUSTOR" at the lower left should be --CONDENSER--; the reference number "1'" to element "P" should be --11--.

Signed and Sealed this

Tenth Day of May, 1994

BRUCE LEHMAN

*Attest:*

*Attesting Officer*  *Commissioner of Patents and Trademarks*